United States Patent [19]

Sumiyoshi et al.

[11] Patent Number: 4,547,434
[45] Date of Patent: Oct. 15, 1985

[54] HEAT-RESISTANT SHIFT MEMBER

[75] Inventors: Kikuo Sumiyoshi; Eiji Sato; Masamitsu Kojima, all of Fujisawa; Masayoshi Izumi; Kingo Miyasaka, both of Ayase, all of Japan

[73] Assignee: Oiles Industry Co., Ltd., Tokyo, Japan

[21] Appl. No.: 647,147

[22] Filed: Sep. 4, 1984

[30] Foreign Application Priority Data

Sep. 9, 1983 [JP] Japan .................. 58-165145

[51] Int. Cl.$^4$ ............................................. F16J 15/12
[52] U.S. Cl. ...................... 428/609; 428/591; 74/579 R
[58] Field of Search .............. 428/609, 591, 626; 74/579

[56] References Cited

U.S. PATENT DOCUMENTS 1,137,373  4/1915  Aylsworth .................. 252/12.6
3,404,061  10/1968  Shane et al. .................. 252/378 R
4,209,177  6/1980  Hall .......................... 277/101

FOREIGN PATENT DOCUMENTS

44-23966  10/1969  Japan .
54-76759   6/1979  Japan .
56-124766  9/1981  Japan .
2031074    4/1980  United Kingdom .
1602989    11/1981  United Kingdom .

Primary Examiner—Veronica O'Keefe
Attorney, Agent, or Firm—LeBlanc, Nolan, Shur & Nies

[57] ABSTRACT

A heat-resistant shift member is disclosed which comprises (i) a fundamental body having substantially a desired configuration and formed of one or more of compressed heat-resistant materials such as expanded graphite with entangled wires being firmly embedded therein, and (ii) a shifting surface layer member integrally covering the shifting surface of the fundamental body which is formed of other compressed sheet-like heat-resistant materials such as asbestos, a heat-resistant sheet material made of fibers of asbestos, etc. laid thereon, one or more of powdered solid lubricant compounds such as metallic sulphide laid on the outer surface of the heat-resistant sheet material, polytetrafluoroethylene resin adhered to the outer surface of the powdered solid lubricant compound so as to partly penetrate into the porous surface thereof and partly form a coating thereon, and the metallic wires made of fine stainless steel wires to enclose the heat-resistant sheet material, the solid lubricant compounds and the polytetrafluoroethylene resin therein, whereby the wires of the fundamental body and the shifting surface layer are partially entangled with each other so that the solid lubricant compounds as well as the polytetrafluoroethylene resin are exposed on the shifting surface in a specific ratio with their being held by and filling the gaps formed between the entangled metal wires. There is also disclosed a method for manufacturing the same.

3 Claims, 12 Drawing Figures

HEAT-RESISTANT SHIFT MEMBER

BACKGROUND OF THE INVENTION

The present invention relates to a shift member and more particularly to a heat-resistant shift member, and also relates to a method for manufacturing the same.

Here the term "heat-resistant shift member" used throughout the present Specification and claims should be interpreted to designate an element which can carry a load with a low coefficient of friction even under temperatures in which the application of generally used lubricant oils is difficult and additionally has a sealing function, i.e. as a sealing element to be used at elevated temperatures, e.g. a bearing bush, a washer, a sliding board, a contact type packing or the like.

Hitherto, as a shift member of this kind a metallic member made of stainless steel or copper alloy within which is embedded pellets of a solid lubricant, a non-metallic material made of graphite, ceramics, etc., a compound material such as the so-called "cermet" and heat-resistant plastic material such as polytetrafluoroethylene resin (PTFE), polyimid, etc. have been publicly known.

However, although these materials are all excellent in heat resistance, they have problems in friction and wear under dry friction conditions and difficulties in mechanical strength, in particular shock impact resistance, not necessarily having good conformability with the counter member, and cannot fulfill those functions sufficiently in the case of minute sliding.

In order to solve these difficulties or problems, as disclosed in e.g. U.S. Pat. No. 1,137,373, Japanese Patent Publication No. 23966/1969 or its corresponding U.S. Pat. No. 3,404,061, etc. a shift member has already been developed wherein expanded graphite obtainable by a special treatment of graphite is shaped in association with a reinforcing member. Although these publicly known shift members have good heat resistance revealing superiority in conformability with the counter member and have improved shock impact resistance compared with regular graphite, the coefficient of friction is rather somewhat higher than that of regular graphite and they have a defect in that they often generate abnormal frictional sounds at the time of shifting under dry friction conditions.

Further a shift member which is produced by similarly shaping a heat-resistant material such as mica, asbestos, etc. together with reinforcing materials has also been publicly known, but it has problems similar to those in the above described shift members.

The reasons why therefor, are considered to reside in the fact that these shift members have large differences in friction coefficients between their static and dynamic friction, and they have a certain extent of flexibility, and also it is considered that the shapes and the natural frequencies of the various components constituting the slip system have an effect on those phenomenon.

In order to solve the above problems the present inventors have already proposed an invention concerning a heat-resistant shift member as Japanese Patent Application No. 140987/1982, filed on Aug. 16, 1982, or its corresponding U.S. patent application Ser. No. 522009 (filed on Aug. 11, 1983) (hereinafter referred to as "specific prior art").

Here this specific prior art will be briefly explained below.

That is, the heat-resistant shift member in accordance with this specific prior art is characterized in that a shift member base material having generally the desired configuration is prepared by shaping one or more of heat-resistant materials selected from the group comprised of expanded graphite, mica, asbestos, etc. together with a reinforcing material of stainless steel mesh so as to have the heat-resistant materials and the reinforcing material integrally confined with each other, and that a shifting surface layer member is prepared which is manufactured such that a heat-resistant sheet comprised of paper, non-woven cloth, woven cloth composed of one or more filaments made of asbestos, carbon (excluding expanded graphite), glass, etc. is covered with powdered solid lubricating compounds, and the heat-resistant sheet thus covered with the lubricating compound is reinforced by putting it on a metal mesh made of fine copper alloy wires, and that the surface of the shift member base material is integrally covered with the shifting surface layer member under compression such that both the metal meshes are entangled with each other.

However, it has been confirmed as a result of being put into practice that although this specific prior art revealed such advantageous properties that the shifting surface layer member generated little abnormal frictional sounds when it shifted under friction relative to the counter member, and showed good wear resistance, new problems were also found such as at the initial stage of friction, in other words, during the period until the powered solid lubricating compound of the shifting surface layer member is transferred on to the surface of the counter member to form thereon a solid lubricating compound film the shifting surface exhibited high frictional resistance (high coefficient of friction), thereby generating abnormal friction sounds and also that at elevated temperatures there was oxidation of the metal mesh made of fine copper alloy wires, which reinforced the shifting surface layer member, causing a siezure of the metal mesh with the counter member.

Among the above problems, a reduction of the high shifting frictional resistance and the generation of abnormal frictional sounds at the initial state of friction can be sought by increasing the compounding amount of polytetrafluoroethylene resin (PTFE) in the powdered solid lubricating compounds of the specific prior art so that its ratio exposed to the shifting surface layer member is increased.

However, with this high compounding amount of PTFE, the PTFE becomes interposed between the interface of the other solid lubricating compounds, which causes the solid lubricating compounds to not be combined with each other, and results in creating various problems originating from the heat expansion and softening of the PTFE particularly at elevated temperature ranges.

That is, at elevated temperature ranges, due to the heat expansion and softening of the PTFE existing between the interface of the powdered solid lubricating compounds the combining force of the powdered solid lubricating compounds with each other is weakened, generating protrusions on the shifting surface layer so that the strength of the shifting surface layer member is considerably decreased. Therefore, the weakening of the combining force of the powdered solid lubricating compounds and the protrusions of the shifting surface layer member cause the softened PTFE to flow with the powdered solid lubricating compounds, the shifting surface layer member to fall off from the surface of the base material, and moving towards a frictional shifting between the heat-resistant material (expanded graphite, etc.) of the shift member base material and the counter member, causing generation of abnormal sounds, etc.

SUMMARY OF THE INVENTION

It is a principal object of the present invention to provide a heat-resistant shift member which can improve the specific prior art while preserving the excellent shifting properties of the powdered solid lubricating compounds (excluding PTFE) and solve the problems, in particular, at the initial stage of friction while effectively utilizating the low frictional properties of the polyetrafluoroethylene resin (PTFE).

It is an object of the present invention to provide a heat-resistant shift member which is suitable to be used under dry friction conditions over a wide range of temperatures ranging from room to high temperatures.

It is another object of the present invention to provide a heat-resistant shift member which is suitable to be used under such conditions where the relative shifting surfaces do not allow lubricant oils, waxes, etc. to be applied due to high temperature conditions.

It is another object of the present invention to provide a heat-resistant shift member which does not generate abnormal frictional sounds even if it is used under the conditions as stated above.

It is a still further object of the present invention to provide a heat-resistant shift member which has superior friction and wear resistance properties even if it is used under the conditions as stated below.

It is a further object of the present invention to provide a heat-resistant shift member which has good conformability with the counter member and also displays a sealing function.

It is also an object of the present invention to provide a method for manufacturing a heat-resistant shift member in accordance with the present invention as described above.

In accordance with the present invention a heat-resistant shift member is provided wherein (i) a shift member base material is prepared such that one or more of heat-resistant materials selected from the group composed of expanded graphite, mica, asbestos, etc. are shaped together with a reinforcing material made of a stainless steel mesh so as to be integral therewith; (i) upon which a shifting surface layer member is prepared such that another heat-resistant sheet material made of one or more of the filaments of asbestos, carbon (excluding expanded graphite), glass, etc. has its surface covered with a solid lubricating layer, and polytetrafluoroethylene is applied to the surface of the solid lubricating layer so as to form a coating thereon and at the same time partly penetrate into the porous surface thereof, finally the so combined heat-resistant sheet material, solid lubricant layer and the PTFE coating being put on metal mesh made of fine stainless steel wires so as to be reinforced; (iii) after the shifting surface layer member is laid on the surface of the shift member base material force is applied to them so that the shifting surface layer member is deformed to reveal a smooth surface comprising the entangled fine stainless steel wires, the solid lubricating compound filled into and held by the meshes of the metallic mesh made of the fine wires and gaps formed between the fine wires, and the polytetrafluoroethylene resin.

As can be seen, the shift member in accordance with the present invention is characterized in that the surface of a shift member base material, which is integrally composed of the heat-resistant material with the reinforcing material made of stainless metal mesh, is covered with the powdered solid lubricant compounds reinforced by fine stainless steel mesh such that the solid lubricant compounds and the PTFE are integrally bonded to the shift member base material.

That is, in the heat-resistant shift member according to the present invention the heat-resistant material e.g. expanded graphite, uniformly fills the openings or the gaps between the metal wires of the stainless steel mesh as the reinforcing material, the reinforcing material itself being deformed by compression to become a mutually entangled state, and the powdered solid lubricant compounds and the PTFE reinforced by the stainless steel mesh and disposed on the surface of the shift member base material uniformly fill the openings or the gaps between the fine stainless steel wires in completely the same way, the reinforcing material made of the stainless steel mesh being deformed to be entangled not only with each other, but also with the reinforcing material of the shift member base material made of stainless steel mesh, so that the shift member base material and the shifting surface layer member are integrally bonded together.

Thus, on the surface of the shifting surface layer member integrally connected to the shift member base material, since there are the solid lubricating compounds and the polytetrafluoroethylene resin reinforced by the stainless steel mesh, at the initial friction stage of the shift member the low frictional property of the polytetrafluoroethylene resin is revealed, decreasing the frictional resistance against the counter member, and the generation of abnormal sounds is suppressed. In an elevated temperature range, even though the polytetrafluoroethylene resin expands with heat and softens, since the polytetrafluoroethylene resin exists independently of the solid lubricating compounds there is no decrease in the mutual combining strength of the solid lubricating compounds due to the softening and flow of the polytetrafluoroethylene resin, and further no separation of the solid lubricating compounds at the time of the frictional shifting occurs at all. Therefore, the shift member in accordance with the present invention generates no abnormal sounds in use over a wide range of temperatures from room to elevated temperatures, revealing superior shifting properties.

The reasons why the stainless steel wire is used to reinforce the shifting surface layer member are as follows.

In the specific prior art, a copper alloy mesh was used in order to reinforce the shifting surface member, but it was found that the use of this mesh brought about such a phenomenon that it seized with the counter member at elevated temperatures.

This is considered to be because the copper component of the copper alloy forms a solid solution with the nickel component of the counter member (stainless steel). Therefore, although there is a defect that the metal becomes the same as that of the counter member, in other words a duplicate metal, stainless steel was adopted as a metal which does not seize with the counter member at elevated temperatures (this phenomena of "seizing with the counter member" should be avoided as much as possible for a shift member).

In this case the area ratio of the fine stainless steel to be exposed on the surface of the shifting surface layer member is preferably 20 to 70%.

Thus, by constituting the shift member so that a reinforcing material made of metal mesh, a solid lubricant and a polytetrafluoroethylene resin are finely disposed uniformly so that their areas exposed on the surface are in a given ratio such advantages can be brought about that the property of the formation of the solid lubricating coating to be formed at the time of the shifting is superior (i.e. the self-repair function of the coating when it breaks is excellent), and it is preferably utilized also in cases wherein minute slip and minute angular oscillation, etc. are expected.

Further, in accordance with the present invention a method for manufacturing the heat-resistant shift member as described above is provided which is characterized in comprising the following steps:

(a) preparing a cylindrical base material element by either alternately piling up sheet-like heat-resistant materials such as expanded graphite sheets and a stainless steel mesh as the reinforcing material, or the sheet-like heat-resistant material and the metal mesh being piled up and then convoluted together, or cylindrically knitted stainless steel mesh having been radially flattened and the heat-resistant material introduced between the space formed by the confronting meshes, and being convoluted together, whereby a cylindrical body is provided;

(b) preparing a shifting surface layer member by
  (i) separately preparing a heat-resistant sheet material with one of the surfaces being bonded with a heat-resistant material made of fibers such as asbestos, and the outer surface of the heat-resistant material being covered with the powdered solid lubricating compound so as to provide a solid lubricating layer; and
  (ii) penetrating into the porous surface portion of the solid lubricating compound a portion of the polytetrafluoroethylene resin with the outer surface of the solid lubricating compouning covered with a coating made of a portion of the polytetrafluoroethylene resin, resulting in a multi-layered member;
  (iii) either piling up this multi-layered member on a mesh made of a fine stainless steel or introducing into the gap formed between the opposed metallic wires made by radially flattening a cylindrically knitted stainless steel mesh;

(c) winding on the cylindrical base material element the shifting surface layer member so that the solid lubricating compound layer and the polytetrafluoroethylene resin are disposed on the outer surface of the shifting surface layer member, whereby a preform of the shift member is provided; and (d) compressing the preform axially along the lamination direction of the cylindrical base material element so that both of the metal meshes are deformed, causing the metal meshes between the respective layers of the cylindrical base material element and the member for forming a shifting surface layer to be entagled with each other.

At this point, it should be added that, in the present invention, as the techniques for constituting a shift member from a heat-resistant material and a reinforcing material as well as for shaping them into the shift member the techniques as disclosed in e.g. Japanese Laid-Open Patent Publication Nos. 76759/1979, 124,766/1981, etc. are generally applied.

BRIEF DESCRIPTION OF THE DRAWINGS

These and other objects of the present invention will become more readily apparent upon reading the following specification and upon reference to the accompanying drawings, in which.

DESCRIPTION OF THE PREFERRED EMBODIMENTS

As has already been described above, a shift member in accordance with the present invention is manufactured by the following steps:

(a) preparing a cylindrical base material such that a heat-resistant material comprising expanded graphite, etc. and stainless steel meshes are laid one upon another, and then are integrally convoluted together;

(b) preparing separately a sheet-like heat-resistant material and bonding to one of the surfaces thereof a heat-resistant sheet material comprising fibers of asbestos, etc.;

(c) preparing a multi-layered member such that the outer surface of the heat-resistant material is covered with a powdered solid lubricant compound to form a solid lubricating compound layer thereon, and the polytetrafluoroethylene resin is forced to penetrate into the porous surface of the solid lubricating compound layer so as to have the surface partly covered with the polytetrafluoroethylene resin as a coating;

(d) preparing a shifting surface layer member by laying the multi-layered member on a metallic mesh made of fine stainless steel wires;

(e) preparing a preform such that the shifting surface layer member is wound around the cylindrical base material so that the powdered solid lubricant compound layer and the polytetrafluoroethylene resin are exposed outside; and (f) putting the preform into a metal die and compressing it in the axial direction of the cylindrical base material so that the metal meshes are entangled with each other and the heat-resistant materials fill the openings of the meshes as well as the gaps between the wires constituting the meshes.

Now the manufacturing processes described above will be respectively explained more fully below in reference to the accompanying drawings.

Figure 1:
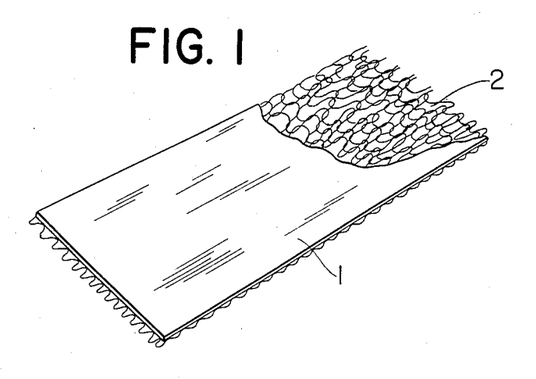
FIG. 1 is a perspective view illustrating stainless steel mesh with a sheet-like expanded graphite being put on one of its surfaces; as one of the forms of the base material of one embodiment of a shift member according to the present invention.

(a) The manufacturing process of the cylindrical base material:

FIG. 1 is a perspective view illustrating, as the first step of this process, the state of putting sheet-like expanded graphite 1 as a heat-resistant material on a stainless steel mesh 2 as a reinforcing material.

Figure 2:
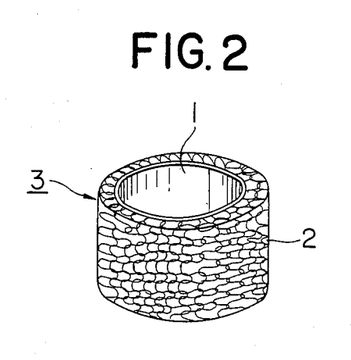
FIG. 2 is a perspective view illustrating a cylindrical base material assembly obtained by convoluting the base material shown in FIG. 1 with the stainless steel mesh being directed outside.

FIG. 2 is a perspective view of a cylindrical base material 3 which is obtained by, as the second step of this process, convoluting the assembly obtained by the 1st step as stated above and shown in FIG. 1 with the heat-resistant material 1 inside.

Figure 3:
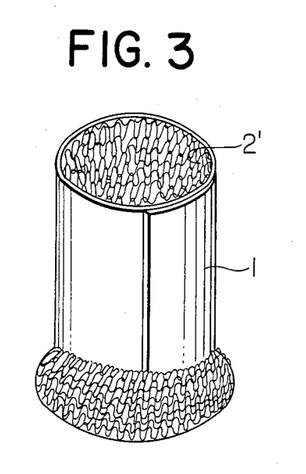
FIG. 3 is a perspective view illustrating cylindrically knitted stainless steel mesh with its outer periphery being surrounded by a sheet-like expanded graphite, as another form of the base material.

FIG. 3 is a perspective view illustrating as a modification of the steps shown in FIGS. 1 and 2 the state that a cylindrically knitted stainless steel mesh 2' has its outer periphery covered with sheet-like expanded graphite 1 in substantially one layer and one end of mesh 2' is begun to be wound outwardly axially together with graphite 1.

Figure 4:
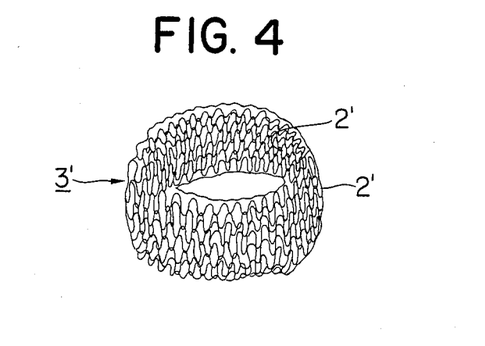
FIG. 4 is a perspective view illustrating a cylindrical assembly which is obtained by winding outwardly and axially the base material shown in FIG. 3 from one of its ends.

FIG. 4 is a perspective view of a cylindrical base material 3' completely wound. In this case, cylindrical base material 3' reveals on its inner and outer peripheries metal mesh 2'.

Contrarily, when the assembly shown in FIG. 1 is convoluted with heat-resistant material inside the obtained cylindrical base material 3 it reveals, as shown in FIG. 2, heat-resistant material 1 and metal mesh 2 on the inner and outer peripheries, respectively. Of course, it will be apparent that if the assembly shown in FIG. 1 is convoluted with heat-resistant material 1 outside, a cylindrical base material is obtainable in which metal mesh 2 and heat-resistant material 1 are located on the inner and outer peripheries, respectively. Further, in the assembly shown in FIG. 1, if heat-resistant material 1 having a lengthwise dimension or a convolute dimension longer than that of the metal mesh 2 by approximately one convolution of a cylindrical base material is obtainable in which both the inner and outer peripheries exhibit heat-resistant material.

Figure 5:
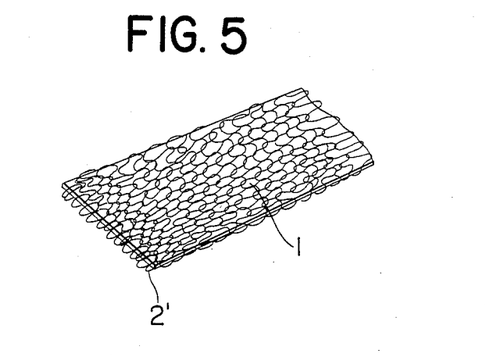
FIG. 5 is a perspective view illustrating still another form of the base material in which cylindrically knitted stainless steel meshes are radially crushed and a sheet-like heat-resistant material is introduced into the gap formed between the confronting meshes.

FIG. 5 is a perspective view illustrating another form of the assembly shown in FIG. 1 in which cylindrically knitted metal meshes are crushed radially so as to become band-like metal meshes 2' and a heat-resistant material 1 is introduced between the gap formed between the confronting meshes. In this case, if the lengths of band-like metal meshes 2' and heat-resistant material 1 are selected so as to be equal, the cylindrical base material obtainable by convoluting this assembly in a manner similar to that shown in FIG. 2 reveals metal mesh on both the inner and outer pheripheries.

Figure 6:
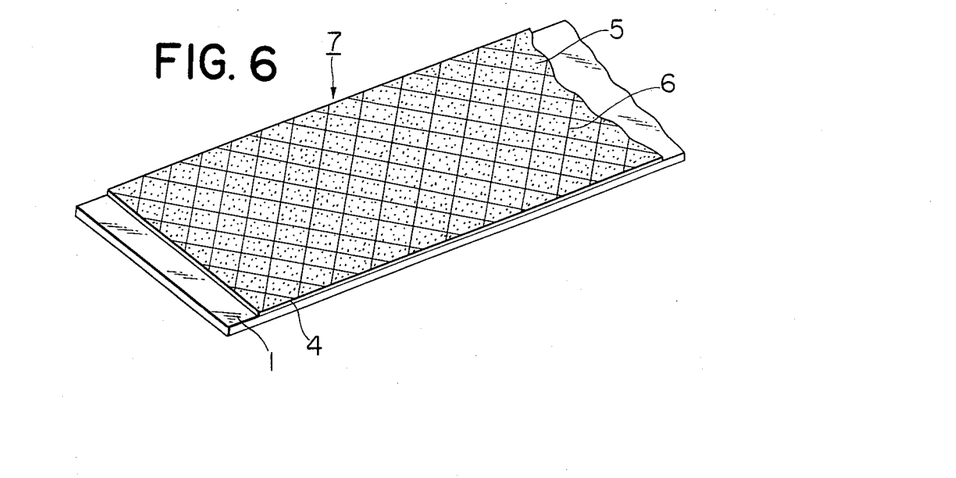
FIG. 6 is a perspective view illustrating one form of a multi-layered member.

(b) The manufacturing process of the multi-layered member;

FIG. 6 shows a multi-layered member as the fundamental element of the shifting surface layer member and it is constituted such that a separately prepared sheet 1 made of a heat-resistant material has one of its surfaces bonded to a heat-resistant sheet material 4, and the outer surface of the heat-resistant sheet material 4 is covered with powdered solid lubricating compounds so as to form a solid lubricating compound layer 5, whereby the solid lubricating compound layer 5 has its porous surface penetrated with a portion of polytetrafluoroethylene resin and has the outer surface thereof covered by a coating 6 made of a portion of the polytetrafluoroethylene resin.

Figure 7:
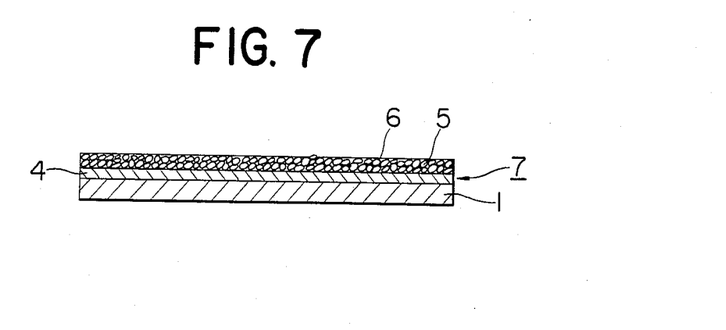
FIG. 7 is a longitudinal sectional view of the multi-layered member shown in FIG. 6.

FIG. 7 shows a longitudinal sectional view of the multi-layered member shown in FIG. 6 on a larger scale.

Sheet-like heat-resistant material 4 that can be used has a thickness of about 0.05 to 1.0 mm, preferably 0.2 to 0.6 mm and comprises paper, non-woven, or woven cloth made of filaments of asbestos, carbon, glass (potassium titanate, alumina-silica, soda-lime glass, etc.).

On each surface of the sheet-like material 4 a thin layer of an adhesive is applied, and one of the surfaces of the sheet-like material 4 is bonded to the sheet 1 of the heat-resistant material, the other of the surfaces being spread with powdered solid lubricating compounds of a desired composition, whereby the solid lubricating compound layer 5 is formed thereon.

Thereafter, a portion of the polytetrafluoroethylene resin 6 is penetrated into the porous surface of the solid lubricating compound layer 5, and a portion of the resin is applied thereon as a coating. Upon hardening of the adhesive, the sheet 1, the heat-resisting sheet material 4, the solid lubricating compound layer 5 and the polytetrafluoroethylene resin 6 are integrally bonded together, resulting in a multi-layered member 7.

The adhesive to be used need not be able to withstand temperatures of several hundred degrees centigrade. Instead it is necessary for the adhesive to have only such adhesive strength that it makes the separation or drop of the applied powdered solid lubricant compound difficult during the manufacturing state of the shift member or during normal handling in the inspection, packing, transportation, assembly, etc. of the shifting surface layer member, and also makes the easy separation of the shifting surface layer member from the surface of the base material due to load or slip at the time of use of the shift member difficult.

As the adhesive the following can be utilized i.e. epoxy resin, phenol resin, polyimide (including polyamide-imide resin), polyvinyl alcohol, corn syrup, gum arabic, glue, solium alginate, etc.

Instead of spreading the powdered solid lubricant compound on the sheet-like heat-resistant material the surface of which is coated with the adhesive, a powdered solid lubricant compound in which the adhesive is mixed may be used, or the compound and the adhesive are mixed together with solvent so as to obtain a slurry- or paste-like substance, and this substance may be applied on the sheet-like material as a thin layer.

It is also preferable that the powdered solid lubricant compound is dispersed in an appropriate dispersing medium and the dispersed compound is coated on the sheet-like material, or the coated material is applied, after coating, a pressure thereon so that the compound fills the meshes, openings, etc. and at the same time covers the surface of the sheet-like material as a thin layer of the compound.

This procedure of applying the powdered solid lubricant compound is particularly effective when the particles of the powdered solid lubricant compound are sufficiently fine enough e.g. to an order of $10^{-1}\mu$ and yet have such properties that the particles easily coagulate with each other after the process of subjecting the sheet-like material to the application and penetration of the dispersed compound.

The thickness of the powdered solid lubricant compound after it is applied to the surface of the sheet-like material is preferably below 0.5 mm, usually 0.02 to 0.3 mm.

The polytetrafluoroethylene resin to be partly penetrated into the porous surface of the solid lubricanting compound layer 5 bonded to the outer surface of the heat-resistant sheet material 4 and to be partly formed on the outer surface of the solid lubricating compound layer 5 as a coating is applied in a form of an aqueous dispersion agent.

The aqueous dispersion agent is applied to the solid lubricating compound layer 5 by e.g. spraying, brushing, rolling etc.

In this case, the solvent in the dispersion agent can be completely vaporized by heating it at a temperature of 120° C. for several minutes after application. By thus treating the dispersion agent the solid lubricating compound layer 5 can be bonded to the sheet-like heat-resistant material 1 to such a degree that the former does not easily come off the latter by a conventional handling.

Figure 8:
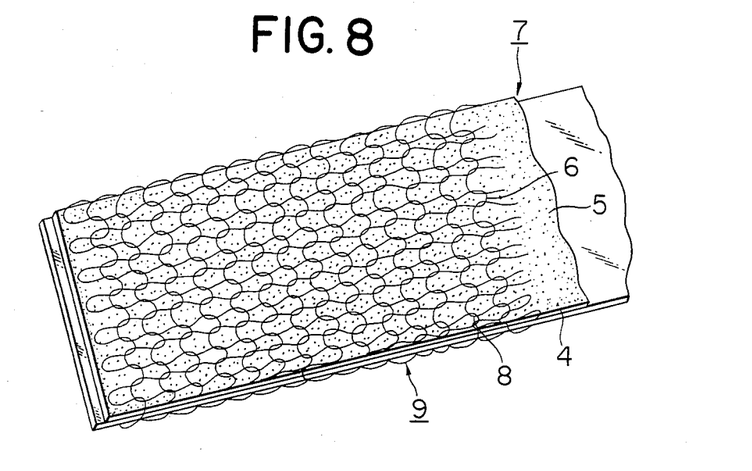
FIG. 8 is a perspective view illustrating another form of the shifting surface layer member in which cylindrically knitted metal meshes are radially crushed and the multi-layered member shown in FIG. 6 is introduced into the gap formed between the confronting meshes.

(c) The process of manufacturing the shifting surface layer member:

The multi-layered member 7 thus formed is reinforced by the metal mesh 8 made of fine stainless steel wires so that the shifting surface layer member 9 is provided. FIG. 8 shows the state that the cylindrically knitted metal mesh made of fine stainless steel wires is crushed radially to form a band-like wire mesh 8', and the multi-layered member 7 is introduced into the gap formed between the confronting metallic meshes 8'.

Figure 9:
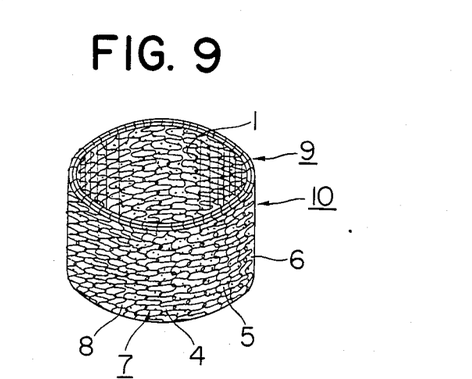
FIG. 9 is a perspective view illustrating one form of the cylindrical member obtained by convoluting the member shown in FIG. 8.

FIG. 9 shows a cylindrical member 10 in a perspective view wherein the multi-layered member 7 enclosed in the band like metallic meshes 8' is convoluted cylindrically for convenience to combine it with the cylindrical base material 3. In this case, this cylindrical member 10 is usually a single winding formed such that the beginning and the end portions are adapted to slightly overlap each other, but it may be doubly wound or more so as to form a cylindrical member.

(d) The process of winding the shifting surface layer member around the cylindrical base material:

As the process for having the outer or inner periphery of the cylindrical base material 3 obtained by the process (a) wound or introduced by the shifting surface layer member 9 obtained by the process (c) the following procedures are conceivable.

(i) The cylindrically knitted wire mesh is crushed radially to form a bank-like wire mesh 8' and introduced between confronting meshes is the multi-layered member 7, and the multi-layered member 7 is wound around the cylindrical base material 3 such that the surface on which the powdered solid lubricant compound 5 and polytetrafluoroethylene resin 6 are applied is directed outwards;

(ii) Similar to the procedure (i) the cylindrically knitted wire mesh 8' into which the multi-laminated material 7 is introduced is convoluted and is introduced into the cylindrical base material 3;

(iii) The assembly in which the cylindrically knitted wire mesh 8' with the multi-layered material 7 introduced therebetween as processed by the above process (i) or the assembly in which the metal mesh is put on the multi-layered material 7, is rolled by rollers so that the multi-layered material 7 and the metal meshes strongly adhere together to become an integral member, and the thus prepared assembly is wound around the cylindrical base material 3 so that the solid lubricating compound layer 5 and the polytetrafluoroethylene resin 6 are directed outwards; and (iv) The multi-layered material 7 is put on the wire mesh 8 or 8', and it is simply wound around the cylindrical base material so that the outside of the multi-layered material 7 is directed outwards.

Among these processes, the process (iii) in which the multi-layered material 7 and the wire mesh are previously compressed together so as to become an integral member, has, compared with the process (i) and (ii) in which no pressure is applied between the multi-layered material 7 and the metal mesh 8 or 8', such an advantage that the distribution of the powdered solid lubricating compound layer 5, the polytetrafluoroethylene resin and the fine wires constituting the stainless steel mesh 8 or 8' exposed on the surface of the finished shift member obtainable through the compression process to be described later is more uniform.

(e) The compression process:

The shifting surface layer member 9 made according to the process (c) described above and the wire 8 or 8' made of the fine stainless steel wires and the multi-layered member 7 reinforced by the metallic wire 8 or 8' is wound around or introduced into cylindrical base material 3 or 3', as shown in FIG. 2 or 4, and the thus obtained preform is next received in a metallic die and axially compressed therein, whereby a finished product is obtained. In this case, the compressive force to be applied is preferably 1 to 3 t/cm².

Figure 10:
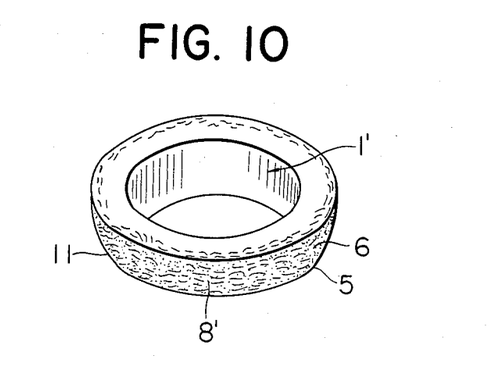
FIG. 10 is a perspective view illustrating one embodiment of a shifting member in accordance with the present invention embodied as a seal bearing.
Figure 11:
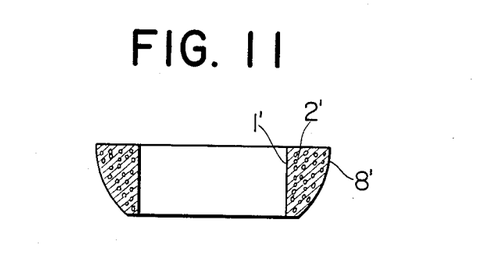
FIG. 11 is a longitudinal sectional elevational view of the embodiment shown in FIG. 10.
Figure 12:
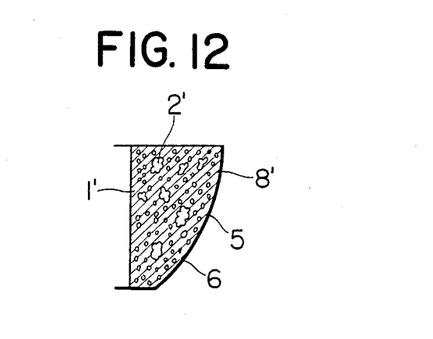
FIG. 12 is an enlarged view of a portion of FIG. 11.

FIG. 10 is a perspective view of a seal bearing as an embodiment of the shift member in accordance with the present invention and obtained by introducing the shifting surface layer member 9 into the cylindrical base material 3 shown in FIG. 2 and the preform thus prepared is introduced into the metallic die and axially compressed therein. In FIG. 10 the reference numeral 1' is a heat-resistant material, and 11 is the shifting surface having a spherical surface, 8' being the scattered fine wires exposed on the shifting surface 11 and subjected to deformation. FIG. 11 is a longitudinal sectional elevational view of FIG. 10 and FIG. 12 is an enlarged partial view of FIG. 11.

In these drawings, the reference numeral 1' denotes the heat-resistant materials which are formed as the result of heat-resistant material 1 being integrally bonded together by being subjected to deformation at the time of compression in the metallic die, and 2' is the stainless steel mesh 2 after similarly being subjected to deformation. It will be appreciated that in the longitudinal sectional view of the shift member the cross-section of stainless steel wire 8' is represented and the fine stainless steel wires 6' are also represented by their cross-sections.

The shift member in accordance with the present invention is manufactured through the processes as stated above and has the constitution as stated above.

Now the principal materials of the shift member will be explained more fully below.

For the expanded graphite among the materials constituting the cylindrical base material a sheet made of expanded graphite or its powders is effectively used, whereby the expanded graphite itself is disclosed in Japanese Patent Publication No. 23966/1969 and sold by the Union Carbide Corp. of the U.S.A.

For the mica, natural or synthetic mica powders or mica powders bonded together by silicon resin to form mica paper are preferable.

For the asbestos the filaments or powders of crystal or amostite base asbestos, or asbestos paper or sheets made of the powders of these kinds of asbestos are effectively used.

Stainless steel wires as the reinforcing material for the base material are preferably those obtainable by weaving or knitting fine wires made of SUS 304 or 316 as defined by the Japanese Industrial Standard (JIS) for austenitic stainless steel or SUS 430 as defined by JIS for ferritic stainless steel, in particular knitted mesh being preferable. The wire diameter can be exemplified as being 0.10 to 0.5 mm, with meshes of 3 to 6 mm being the most preferable.

As to the metal mesh 8 or 8' it is made of the same fine stainless steel wires as that of the stainless steel mesh 2 of the reinforcing material of the heat-resistant material.

Among the constitutional elements of the shifting surface layer member 9 the powdered solid lubricant compound may comprise any one or combination of (i), (ii), (i)+(ii), (i)+(ii)+(iii), (i)+(ii)+(iii)+(iv), (i)+(iii), (ii)+(iii), (ii)+(iii)+(iv), (ii)+(iv) selected from the groups (i) to (iv) wherein:
  (i) Metallic sulphide: $MoS_2$, $SW_2$, $Sb_2S_3$, PbS, FeS;
  (ii) Graphite (Scaly graphite, etc., excluding expanded graphite) and BN;
  (iii) Copper and copper alloy: Cu, 91Cu-4Fe-5Mn, brass, bronze; and
  (iv) Metallic fluoride: $CaF_2$, $BaF_2$, LiF.

In particular, the most preferable combinations are listed in Table 1.

TABLE 1

| Combination | Example (Volume %) |
|---|---|
| (i) + (ii) | 85 $MoS_2$ + 15 Graphite |
| (i) + (ii) + (iii) | 45 $WS_2$ + 20 Graphite + 35 (91Cu—4Fe—5 mn) |
| (i) + (ii) + (iii) + (iv) | 40 $WS_2$ + 20 Graphite + 30 (91Cu—4Fe—5Mn) |
| (i) + (ii) + (iv) | 80 $WS_2$ + 15 Graphite + 5 $CaF_2$ |
| (i) + (iii) | 70 $WS_2$ + 30 (91Cu—4Fe—5Mn) |

Note: The respective numerals affixed to the respective elements of (Cu—Fe—Mn) represent Wt. %.

The powders shown in the respective groups are used in a minute powder form on the order of below approximately 100 mesh. Further, among those groups, when the group (ii) is used it is effective to be used in combination with the group (iv).

Although the elements shown in group (iv) are not of themselves such low friction substances, by the combined used with those shown in group (ii) oxidizing loss at high temperatures is prevented, contributing to the maintainence of lubricability.

The powders of the copper and copper alloy as shown in the group (iii) can not be said to be solid lubricating compounds of themselves, but by combining them with the solid lubricating compounds as described in the other groups the apparent hardness of the surface is increased, the supply of the solid lubricating compound to the friction surface is controlled, narrowing the difference between the coefficient of static and dynamic friction, and contributes to suppressing the generation of abnormal frictional sounds.

As the aqueous dispersion agent to be partially penetrated into the porous surface of the solid lubricating compound layer 5 and also to partially cover the outer surface thereof as a coating "Teflon 30 J" (trade name) solid constituent being 60 Wt. %) solid by Mitsui Fluorochemicals Co., Ltd. is recommended.

This "PTFE" remarkably contributes to a decrease in the coefficient of friction of the solid lubricant compound, and since its frictional behaviour in regard to sliding velocity does not represent a "negative resistance" it can considerably improve the phenomena of "adhesion-slip", contributing to prevention of the generation of abnormal frictional sounds.

The results of the experiments conducted to investigate the property of the shift member in accordance with the present invention are shown in Table II in which the results of conventional members simultaneously tested as also shown.

Test Conditions

Load: 5 $kg/cm^2$
Sliding Velocity: 12 m/min
Environmental Temperature: 400° C.
Counter Member: SUS 304

In Table II the value of the coefficient of friction is represented by the value after the lapse of 1 hour from the start of test, and the value of the wear is represented by the value after the lapse of 20 hours from the start of the test. The evaluation of abnormal frictional sound is determined by the following criteria:
  I: Only usual frictional sounds generated, no abnormal frictional sounds generated;
  II: While keeping the ear near the test piece, in addition to frictional sounds abnormal sounds can be faintly heard;
  III: At a definite position (a point spaced 1.5 m apart from the test piece) frictional sounds can be hardly heard, being absorbed by ambient sounds, so it is generally difficult to discriminate the former form the latter, but can be discriminated by the tester;
  IV: At a definite position anyone can discriminate abnormal frictional sounds as unpleasant sounds.

Further, in Table II "Conventional Shift Member (I)" and "Conventional Shift Member (II)" denote the shift members made in accordance with the techniques disclosed in Japanese Laid-Open Patent Publication Nos. 24619/1983 and 76759/1979, respectively.

As can be seen from Table II the shift member according to the present invention, compared with the specific and conventional prior art, exhibits substantially a low coefficient of friction value, in particular, an extremely low coefficient at the initial state of the friction, generating entirely no abnormal frictional sounds and the present invention obtained a good evaluation throughout the test period.

Contrarily, the conventional shift members, in particular, ones containing the polytetrafluoroethylene resin in the solid lubricating compound layer exhibited a coefficient of friction lower than that of the specific prior art and the conventional shift member (1) and (2), but portions were found where the flow of the polytetrafluoroethylene resin occurred due to its softening and the solid lubricating compound layer fell off the shifting surface.

TABLE II

| | Present Invention | Specific Prior Art | | | Conventional Shift Member (1) | Conventional Shift Member (2) |
|---|---|---|---|---|---|---|
| Reinforcing Material | (SUS 304) Knitted Stainless Steel Mesh | (SUS 304) Knitted Stainless Steel Mesh | (SUS 304) Knitted Stainless Steel Mesh | | (SUS 304) Knitted Stainless Steel Mesh | (SUS 304) Knitted Stainless Steel Mesh |
| Heat Resistant Material | Expanded Graphite (In association with a sheet) | Expanded Graphite (In association with a sheet) | Expanded Graphite (In association with a sheet) | | Expanded Graphite (In association with a sheet) | Expanded Graphite (In association with a sheet) |
| Constitution of Shifting Surface Layer Forming Member | | | | | | |
| Solid Lubricant Compound Layer | 40 $WS_2$ + 20 Graphite + 30(Cu—Fe—Mn) + 10 $CoF_2$ | 40 $WS_2$ + 20 Graphite + 30(Cu—Fe—Mn) + 10 $CaF_2$ | 50 $WS_2$ + 40 PTFE + 10 Graphite | | 40 $WS_2$ + 20 Graphite + 30(Cu—Fe—Mn) + 10 $CaF_2$ | None |
| Heat-Resistant Sheet | Carbon Paper | Carbon Paper | Carbon Paper | | None (Surface made of Expanded Graphite being directly covered) | |
| PTFE Reinforcing Metal Mesh | Existing Cylindrically Knitted Stainless Steel Metal Mesh (SUS 304) | None Cylindrically Knitted Stainless Steel Metal Mesh (SUS 304) | None Cylindrically Knitted Nickel-Silver Metal Mesh (JIS H3721 NSW2) | | None Cylindrically Knitted Stainless Steel Metal Mesh (SUS 304) | |
| Coefficient of Friction | 0.05–0.08 | 0.1–0.12 | 0.08–0.10 | | 0.1–0.15 | 0.05–0.2 |
| Wear Amount (mm) | 0.05–0.1 | 0.05–0.1 | 0.1–0.5 | | 0.05–0.15 | 0.1–0.4 |
| Abnormal Frictional Sounds at the Initial Frictional State | I | II | I–II | | II–III | IV |
| Abnormal Frictional Sounds | I–II | I–II | I–III | | I–III | IV |
| State of Counter Member | Good: Formed with a thin black film of solid lubricant compound. | Good: Formed with a thin black film of solid lubricant compound. | Although a thin black film of solid lubricant compound was formed a partial flow of solid lubricant compound and a direct contact portions with the reinforcing metallic mesh (Ni—Ag) were found. | | Linear Scratches were found, but seizure of fine stainless steel wires was found. | Abnormal displacement and adhering of expanded graphite and a partial siezure of fine stainless steel wires was found. |

It is to be understood that although certain embodiments of this invention have been illustrated and described, it is not to be limited thereto except insofar as such limitations are included in the annexed claims.

What is claimed is:

1. A heat-resistant shift member comprising a fundamental body which is formed of one or more compressed heat-resistant materials selected from a group composed of expanded graphite, mica and asbestos with entangled stainless steel wires originally having constituted a metallic mesh being firmly embedded therein, and a shifting surface layer member integrally covering the shifting surface of said fundamental body which is formed of a heat-resistant sheet member composed of filaments made of one or more of asbestos, carbon (excluding expanded graphite) and glass, one or more of solid lubricating compounds laid thereon, and a polytetrafluoroethylene resin applied on the outer surface thereof so as to partly penetrate into the porous outer surface thereof and to partly form a coating thereon, said heat-resistant sheet member and said solid lubricating compounds being reinforced by a metallic mesh made of fine stainless steel wires by being introduced within said metallic mesh together with said polytetrafluoroethylene resin, whereby said shifting surface layer member is formed of entangled fine metallic wires originally having constituted said metallic mesh of said shifting surface layer member, and said solid lubricating compounds and said polytetrafluoroethylene resin firmly embedded in and held by the meshes of said metallic mesh and the gaps formed between said fine stainless wires, the outer surface of said shifting surface layer member having a smooth surface.

2. A heat-resistant shift member as claimed in claim 1 wherein said solid lubricant compound comprises any one or combination of the groups (i) to (iv) such as (i), (ii), (i)+(ii), (i)+(ii)+(iii), (i)+(ii)+(iii)+(iv), (i)+(iii), (ii)+(iii), (ii)+(iii)+(iv), or (ii)+(iv), whereby said group (i) to (iv) are respectively as follows:
   (i) metallic sulfide;
   (ii) graphite (excluding expanded graphite), or boron nitride;
   (iii) copper, or copper alloy; and
   (iv) metallic fluoride.

3. A heat-resistant shift member as claimed in claim 1 wherein 20 to 70% of said fine stainless steel wires is exposed on said outer surface of said shifting surface layer member.

* * * * *